US006879059B2

(12) United States Patent
Sleva

(10) Patent No.: US 6,879,059 B2
(45) Date of Patent: Apr. 12, 2005

(54) INTERRUPTIBLE POWER SUPPLY MODULE

(75) Inventor: Anthony Francis Sleva, Allentown, PA (US)

(73) Assignee: Sleva Associates, Inc., Allentown, PA (US)

( * ) Notice: Subject to any disclaimer, the term of this patent is extended or adjusted under 35 U.S.C. 154(b) by 662 days.

(21) Appl. No.: 09/899,797

(22) Filed: Jul. 5, 2001

(65) Prior Publication Data

US 2003/0011246 A1 Jan. 16, 2003

(51) Int. Cl.[7] .................................................. H02J 1/00
(52) U.S. Cl. ........................................................ 307/38
(58) Field of Search .............................. 307/38, 39, 40, 307/29, 41; 361/65, 66

(56) References Cited

U.S. PATENT DOCUMENTS

| | | | | |
|---|---|---|---|---|
| 4,168,491 A | * | 9/1979 | Phillips et al. .............. 340/501 |
| 4,213,058 A | * | 7/1980 | Townsend .................... 307/40 |
| 4,336,462 A | * | 6/1982 | Hedges et al. ................ 307/35 |
| 4,348,669 A | * | 9/1982 | Braun .................... 340/825.58 |
| 4,363,974 A | * | 12/1982 | Beckwith ..................... 307/40 |
| 4,686,382 A | | 8/1987 | Shuey |
| 4,866,757 A | | 9/1989 | Nilssen |
| 5,070,522 A | | 12/1991 | Nilssen |
| 5,081,367 A | | 1/1992 | Smith et al. |
| 5,168,170 A | | 12/1992 | Hartig |
| 5,170,310 A | * | 12/1992 | Studtmann et al. ........... 361/94 |
| 5,414,640 A | | 5/1995 | Seem |
| 5,436,511 A | * | 7/1995 | Nigawara et al. ............. 307/39 |
| 5,502,339 A | | 3/1996 | Hartig |
| 5,687,052 A | * | 11/1997 | Bennett ...................... 361/190 |
| 5,905,616 A | * | 5/1999 | Lyke .......................... 361/64 |
| 6,011,324 A | | 1/2000 | Kohlstruck |
| 6,153,943 A | | 11/2000 | Mistr, Jr. |
| 6,184,659 B1 | | 2/2001 | Darmawaskita |
| 6,191,500 B1 | | 2/2001 | Toy |
| 6,226,305 B1 | * | 5/2001 | McLoughlin et al. ....... 370/532 |
| 6,278,200 B1 | * | 8/2001 | Daniel et al. ................. 307/31 |
| 6,381,111 B1 | * | 4/2002 | Reichert et al. .............. 361/31 |
| 6,476,519 B1 | * | 11/2002 | Weiner ....................... 307/66 |
| 6,573,619 B2 | * | 6/2003 | Chin .......................... 307/125 |
| 6,654,216 B2 | * | 11/2003 | Horvath et al. ............... 361/65 |

* cited by examiner

Primary Examiner—Gregory J. Toatley, Jr.
(74) Attorney, Agent, or Firm—Wendy W. Koba

(57) ABSTRACT

An interruptible power supply module, located at a customer's premise, functions to reduce the demand on a power utility company. As a power utility senses a critical power supply demand situation, it sends an "interrupt power" control signal through an alternative communications network (a telecommunications network, for example), to each subscribing customer. Upon receipt of the "interrupt" control signal, a switch is activated in the customer's interruptible power supply module to remove a pre-defined "interruptible" load for a predetermined period of time (perhaps not to exceed 15 minutes in any hour). The module may also be used to "gracefully" add interruptible loads back onto the system after a complete power outage.

22 Claims, 6 Drawing Sheets

INTERRUPTIBLE POWER SUPPLY MODULE

TECHNICAL FIELD

The present invention relates to an interruptible power supply module and, more particularly, to a customer-based module for designating certain loads as "interruptible" and thus capable of being turned off by the power company when necessary.

BACKGROUND OF THE INVENTION

With increasing regularity, electric power utility companies have initiated "black outs", "brown outs", and "rolling blackouts" to cope with a condition of too little available energy and too much demand. Increases in energy prices coupled with worsening pollution levels add to the problems associated with the unrelenting demand for electrical energy.

In many cases, un-announced blackouts (from an extreme over-demand) on the supply cause havoc within affected businesses, as well as within the residential community. Pro-active "brownouts", where the utility company schedules the brownouts in advance, provides some relief in terms of giving an advanced warning to the affected customers, but is still an inconvenience.

Thus, a need remains for a system of providing the necessary decrease in power demand during shortfall situations that does not unduly hamper the power company customer base.

SUMMARY OF THE INVENTION

The need remaining in the prior art is addressed by the present invention, which relates to an interruptible power supply module and, more particularly, to a customer-based module for designating certain loads as "interruptible" and thus capable of being turned off by the power company when necessary.

In accordance with the present invention, an interruptible power supply module is configured by a customer to designate certain loads as "interruptible". In the residential environment, such loads may include, for example, water heaters, clothes dryers, dehumidifiers, and the like. The remainder of the customer's load is then defined as "firm" and not subject to possible interruption (for example, refrigerators, stoves, water pump, computers, etc.). The interruptible power supply module is activated by a control signal transmitted by the power company through an alternative communication network (i.e., a network other than the power company transmission lines and already providing communication to the residence) and functions to remove the designated interruptible load from the input power supply line.

In operation, when the electric power company senses a generation/supply problem, an "interrupt" control signal is sent from the power company, via the alternative network, to selected interruptible power modules, requesting the modules to cut off power to the customer-designated interruptible loads. The "interrupt" is relatively short (for example, 15–20 minutes), then the loads are brought back on line. The customer base of "interruptible" loads are divided into groups, where each group is selected to be interrupted on a "rolling" basis. In a preferred embodiment, the customer base is divided into four groups, each group experiencing a 15 minute interruption during the course of an hour. In this fashion, the utility company has the benefit of a load reduction for a full hour, but any one customer only experiences a 15 minute outage on their interruptible load.

It is an advantage of the present invention that when a sustained power failure has occurred, the interruptible power module can be used to further extend the outage of the interruptible loads beyond the time the rest of the loads are brought up when power is restored. That is, the module can be used to extend the power failure associated with the interruptible loads for an additional 15 to 30 minutes (for example).

During a situation such as underfrequency load shedding, this same advantage can be used to cut power to the interruptible loads to avoid the need for prolonged, scattered and widespread blackouts in the community.

Other and further advantages and features of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
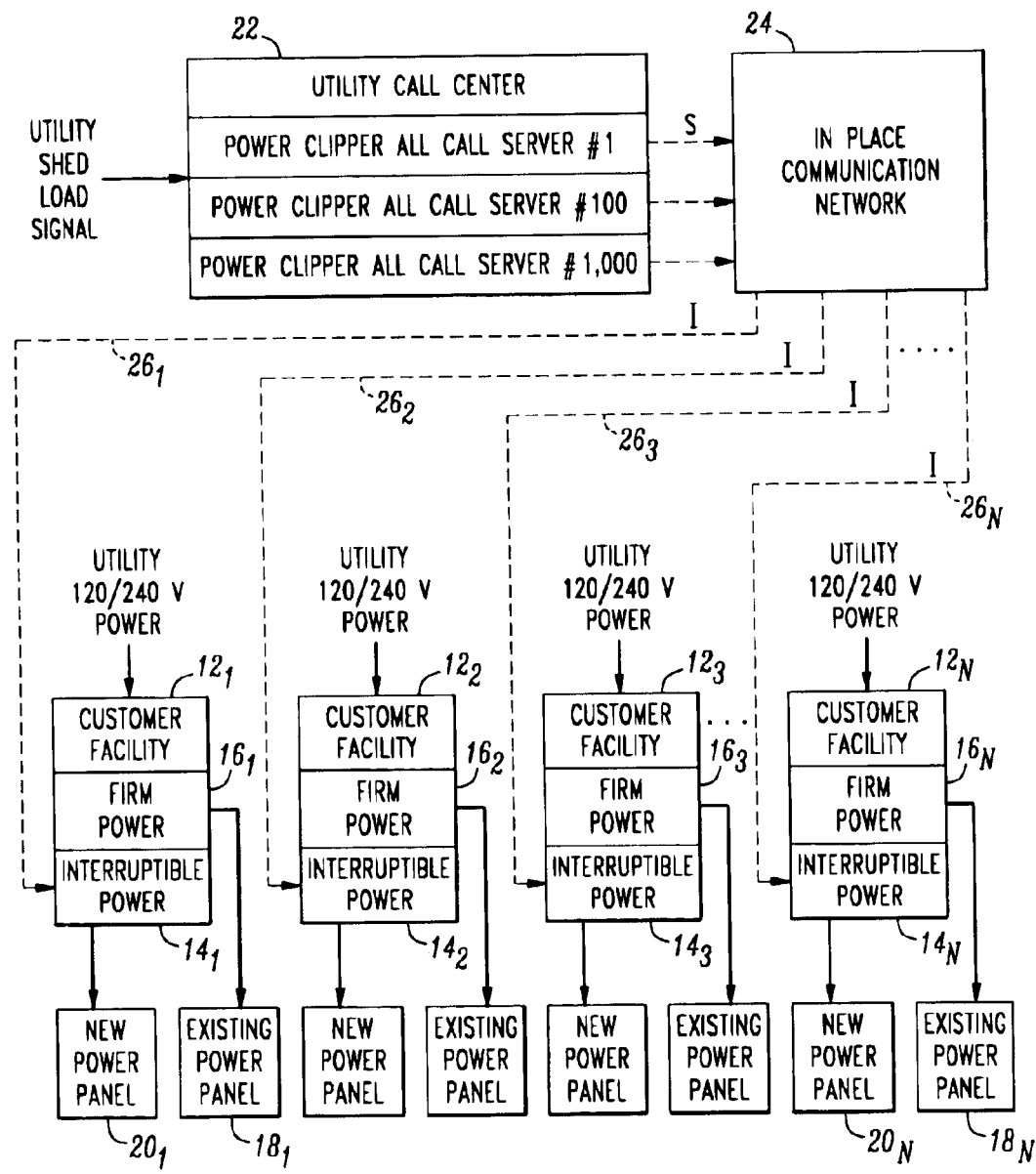
FIG. 1 illustrates, in block diagram form, an exemplary arrangement for implementing the interruptible power supply feature of the present invention for a plurality of electric power company customers.

FIG. 1 illustrates an exemplary network arrangement 10 for deploying the interruptible power supply technique of the present invention. Included in this arrangement is a plurality of customers $12_1$–$12_N$, where each customer has selected certain loads within its premises that may be subject to "interruptible power", these loads designated $14_1$–$14_N$, with the remaining loads defined as "firm power" and designated $16_1$–$16_N$. Each customer's existing power panel $18_1$–$18_N$ may be associated with the "firm power" load, and a separate power panel $20_1$–$20_N$ associated with the pre-selected "interruptible power" loads.

In accordance with the teachings of the present invention, a utility call center 22 is included in the arrangement and functions to react to changes in load conditions experienced by the power company and determine when the need arises to clip the load of power being distributed to customers $12_1$–$12_N$. When call center 22 is directed to shed load, it sends a control signal S to an element in an alternative communication network 24. Network 24 includes a plurality of communication paths $26_1$–$26_N$ which are connected to interruptible power loads $14_1$–$14_N$, respectively. Therefore, when control signal S is received by network 24, a set of "interrupt" signals I will be transmitted along paths 26 to the plurality of interruptible power loads 14, turning "off" these loads for a predetermined period of time.

In one embodiment of the present invention, the "interrupt" may be for a period not to exceed fifteen minutes each hour. Thus, the interruptible loads for be available for use by the customer for 75% of the time, yet the power company will recognize a considerable saving, as will be discussed in detail below, in each instance that it can reduce the total load on the system.

Figure 2:
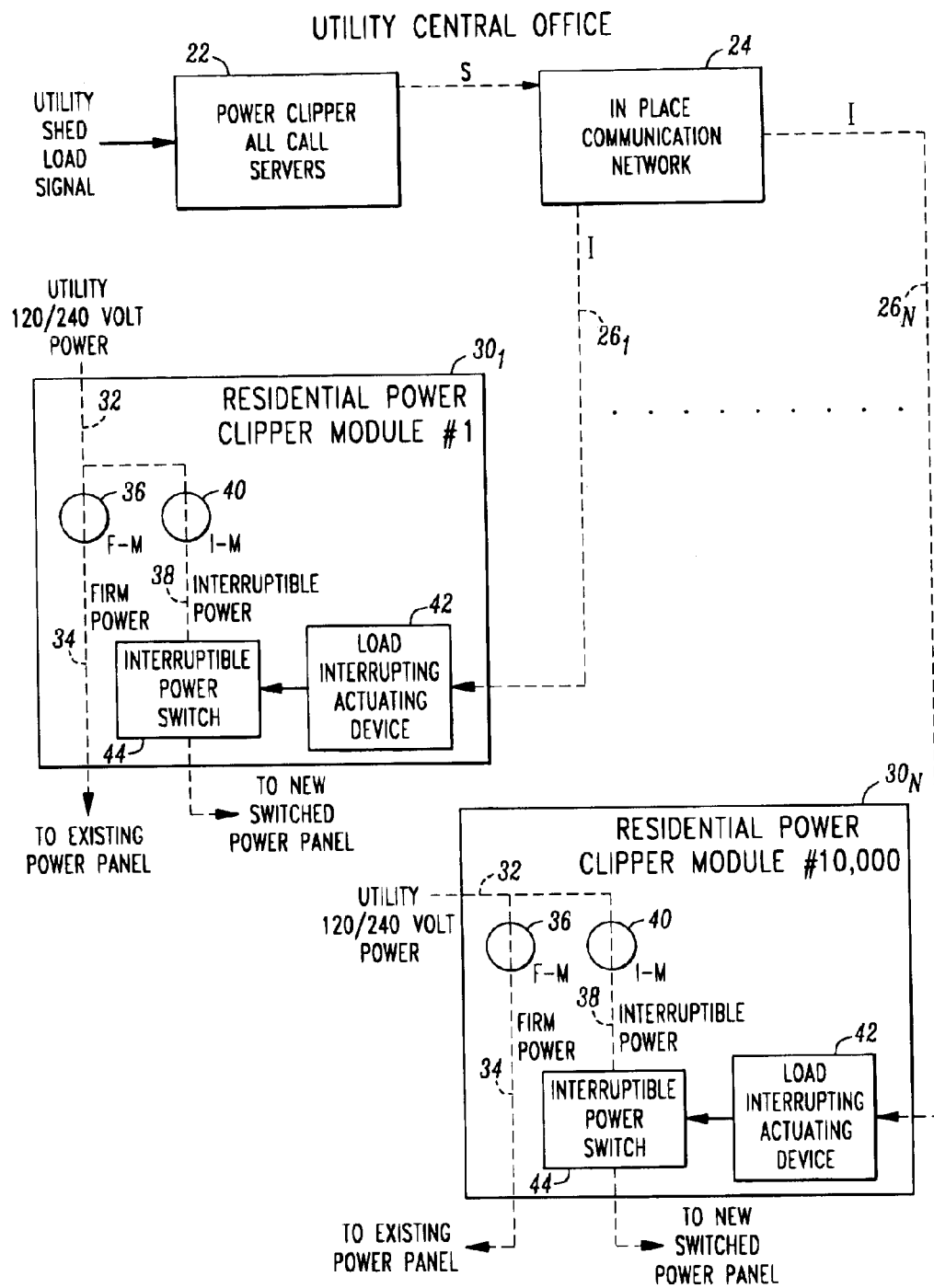
FIG. 2 is a block diagram showing, in more detail, a portion of the exemplary arrangement of FIG. 1, depicting in particular a pair of interruptible power supply modules.

FIG. 2 illustrates, in more detail, a pair of exemplary interruptible power supply modules $30_1$ and $30_N$, connected to alternative communication network 24 in order to control the activation of the customers' interruptible loads. As discussed above, a control signal S from utility call center 22 will be sent to network 24 when it is desired to deactivate the predetermined interruptible loads. Separate "interrupt" signals I are sent along communication paths 26 to each customer and applied as an input to interruptible power supply module 30. As mentioned above, in one embodiment of the present invention, the in-place telecommunications network may be used to supply this "interrupt" input signal to module 30, where path 26 comprises the subscriber's in-place telephone line. The existing electric power line 32 is also applied as an input to module 30, as illustrated by the dashed line input. Power line 32 is then split between the "firm" power load 34, including a firm power meter 36, and an "interruptible" power load 38, including an (optional) interruptible power meter 40.

Exemplary "firm" loads may comprise necessary electrical appliances such as refrigerators, electric stoves, room lighting, microwave ovens, clothes washers, computers and their accessories, televisions, radios and water pumps. Exemplary "interruptible" loads may comprise appliances that can be interrupted with minimal impact to the user, such as water heaters, space heaters, air conditioners, dehumidifiers, dishwashers, clothes dryers, oil burner motors. In general, the designation between "firm" and "interruptible" is a design choice of each individual subscriber, who can delineate which loads in his particular facility are to be defined as "firm" and which other loads can be defined as "interruptible".

Referring back to FIG. 2, interrupt control signal I is applied as an input to a load interrupting actuating device 42, which is then used to control the action of an interruptible power supply switch 44 (which is normally closed). Therefore, when an "interrupt" signal I is received by actuating device 42, a signal will be sent to switch 44, opening switch 44 and removing the interruptible power load from the demand on power line 32.

Figure 3:
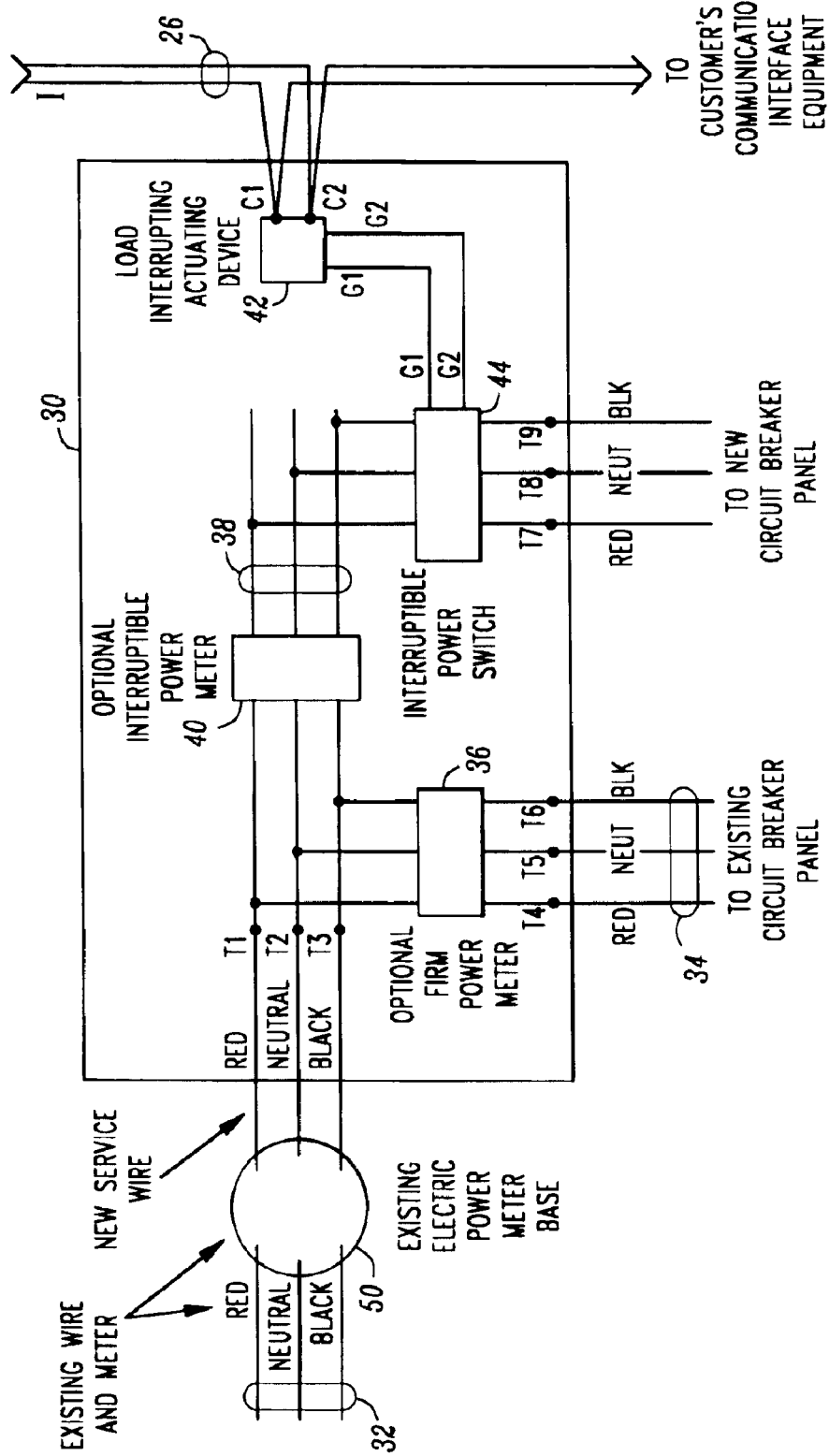
FIG. 3 includes a module schematic and wiring diagram for an exemplary interruptible power supply.

FIG. 3 illustrates in more detail a wiring diagram associated with the input of interrupt control signal I and electrical power to an exemplary interruptible power supply module 30. As shown, the three conductor (red, neutral, black) power line input 32 may first pass through an existing power meter 50, and then be applied as three separate inputs to module 30. The three conductors are coupled in parallel to both firm power meter 36 and interruptible power meter 40, where it is to be understood that the use of both "firm" and "interruptible" meters is optional, and indeed, the original, single meter may be used in its place, as long as the interruptible load terminates on a separate panel that can be switched out of service. The three-conductor output from interruptible power meter 40 is then applied as an input to interruptible power switch 44. As discussed above, "interrupt" control signal I, coming as an input along path 26 from an alternative communication network, is applied as an input to load interrupting actuating device 42, which then sends an "open switch" signal to interruptible power switch 44, disconnecting the interruptible load from power lines 38, removing this load from the demand on the power utility company. As shown in FIG. 3, communication path 26 may also continue beyond module 30, and eventually be coupled into its usual customer-based equipment. When communication path 26 comprises an input telephone line, for example, path 26 would then be connected to the customer's network interface unit. The presence of the power supply interrupt signal on the communication line will not interfere with the conventional use of this signal path and can, in fact, be filtered out at the network interface unit.

Figure 4:
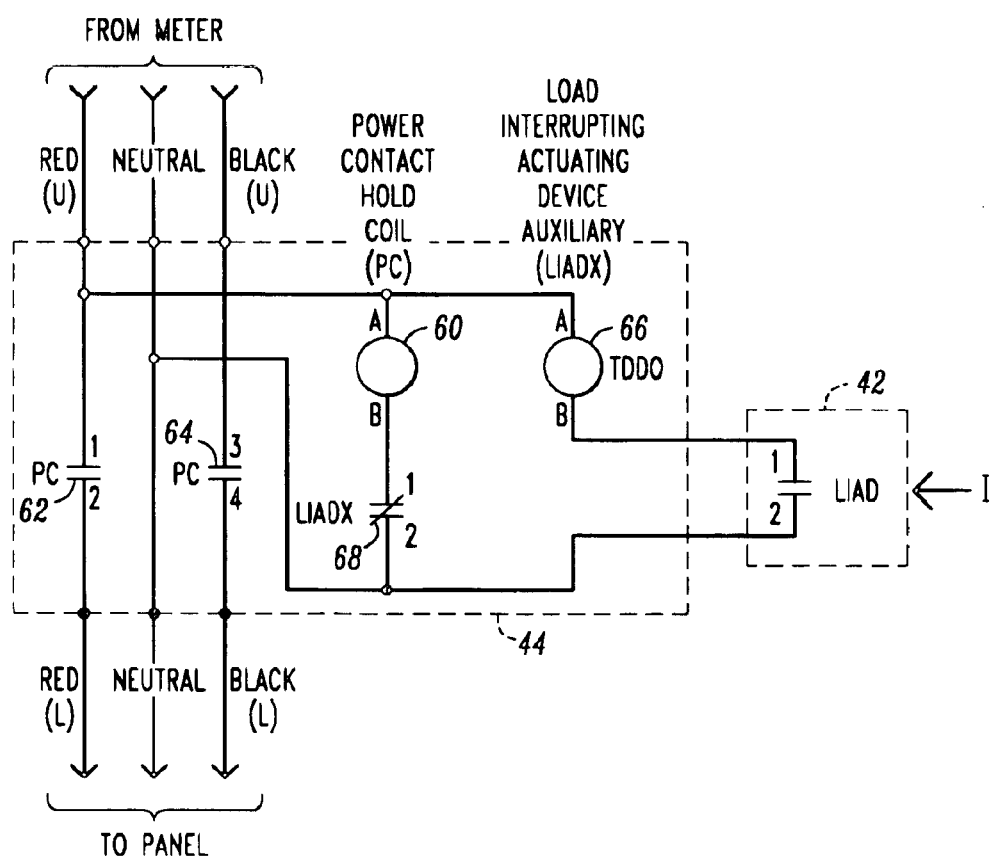
FIG. 4 illustrates an exemplary wiring diagram for an interruptible power supply module of the present invention.

FIG. 4 illustrates, in detail, a wiring diagram associated with the operation of interruptible power supply switch 44, as well as the operation of load interrupting actuating device 42. In its "quiescent" state (i.e., in the absence of an "interrupt" signal from load interrupting actuating device 42), a power contact (PC) hold coil 60 will be energized, closing contacts 62 and 64 on the "red" and "black" power lines on interruptible power supply input 38, allowing the input power on line 32 to flow into the interruptible power supply panel (not shown). Upon receipt of an "interrupt" signal I by load interrupting actuating device 42, a time-delay drop-out (TDDO) coil 66 will be energized and used to open a normally-closed load interrupting actuating device auxiliary (LIADX) contact 68. The closing of contact 68 functions to de-energize coil 60, thus opening power contacts 62 and 64 on the power conductors into interruptible load interface module 44, cutting off the transmission of power to the interruptible power supply panel, in accordance with the present invention. Thus, the opening of contacts 62, 64 is sufficient to remove the customer-designated interruptible load and reduce the demand on the power utility.

An aspect of the present invention is to control the length of the power outage for these interruptible loads. For example, a timer can be included with LIADX coil 66 so that the coil remains de-energized for only a predetermined time interval (for example, for fifteen minutes). In this case, therefore, the consumer will not be extremely inconvenienced by having these interruptible loads unavailable for extended periods of time.

Figure 5:
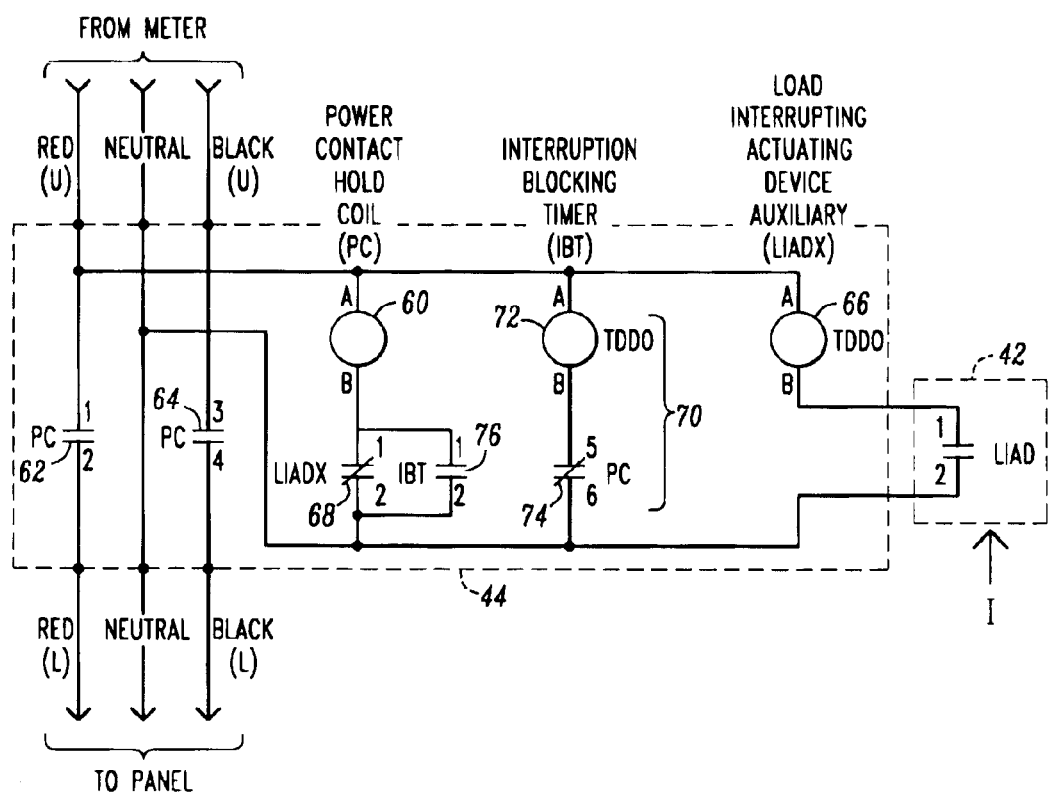
FIG. 5 illustrates an alternative embodiment of the interruptible power supply module of FIG. 4, including an interruption blocking timer for preventing the interruptible load from being disconnected too many times during a predetermined time period.

An additional feature of the interruptible power supply module of the present invention is that an interruption blocking timer (IBT) 70, as shown in FIG. 5, can be used with the circuitry of interruptible power switch 44 to assure that loads are not interrupted more than once during a predetermined time period, as controlled by the host utility. The inclusion of IBT 70 can be utilized to ensure that the "interruptible" loads are not interrupted more than once during a one hour time period (alternatively, the time period may extend to two hours, the time period being under the control of the host utility). In the arrangement of FIG. 5, timer 70 includes an energized coil 72 and "normally closed" power contact 74. Thus, when coil 72 is energized, an IBT contact 76, disposed in parallel with LIADX contact 68, will ensure that the power contacts 62, 64 will not be re-opened during the predetermined time period.

When distribution lines are out of service of extended periods of time, load diversity is lost and (in conventional arrangements) all loads turn on as soon as power becomes available, causing significant peaking problems ("cold load inrush"). In accordance with the present invention, the interruptible power supply module of the present invention may be configured to allow for the interruptible loads to remain open once the main power has been restored, and stay open for a random period of time between 15 and 45 minutes (for example) after firm load restoration. This allows for load diversity to be maintained during load re-energization without relying on the utility company to manually stagger the turn-on of different customer loads.

Figure 6:
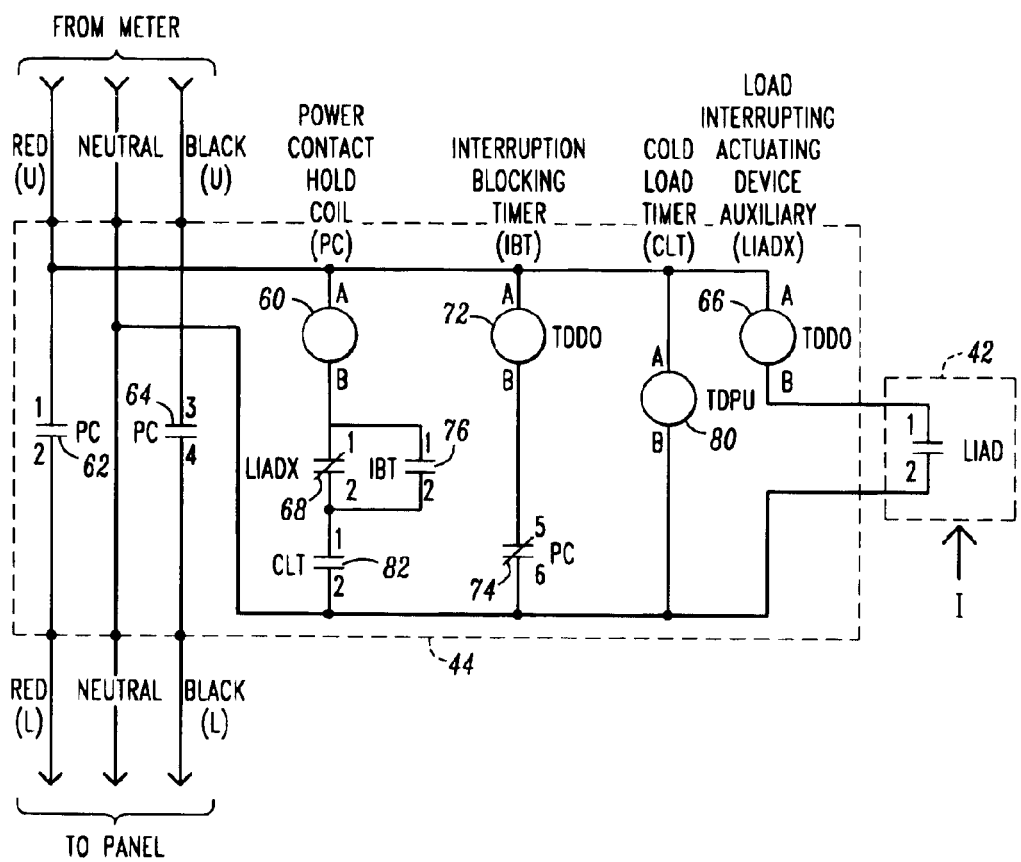
FIG. 6 illustrates yet another embodiment of the present invention, including a cold load inrush feature which prevents a designated interruptible load from coming back on line for an additional period of time following a power outage.

FIG. 6 illustrates an embodiment of the present invention that incorporates this cold load inrush feature with the action of interruptible power supply switch 44. As shown, a cold load timer coil 80 is disposed in parallel with interruption blocking timer coil 72 and remains in its energized state. Cold load timer (CLT) coil 80 functions to control a cold load timer contact 82 disposed in series with the parallel arrangement of LIADX contact 68 and IBT contact 76, as shown. As long as CLT coil 80 remains energized, CLT contact 82 will remain closed. However, on loss of power, coil 80 will be de-energized and can be controlled by a "time delay pick up" (TDPU) timer so that it will not re-energize for a predetermined period of time after the main power has been restored. For example, TDPU may be set to allow for an additional thirty minutes to transpire prior to re-energizing coil 80. Once coil 80 is re-energized, CLT contact 82 will re-close and allow for PC coil 60 to re-energize and close power contacts 62 and 64, restoring the interruptible power supply loads to the line.

It is to be understood that the interruptible power supply module of the present invention may also be used in situations where the module has not yet been connected to an alternative communications network. In this case, a power utility may activate the module by initiating a quick trip-quick reclose of the feeder at the substation. This action will be sensed by the load interrupting actuating device and perform as described above to interrupt the power supplied to the interruptible load.

Load and air pollution reductions are a function of market penetration, percent load interrupted, and the total system load. Load reductions for a market penetration of 10% of the customer base to 60% of the customer base, with a 50% load interruption factor (i.e., each customer designating half of its load as "interruptible", and the customer base divided into four groups, each group rolled through sequential 15 minute interruptions) are shown in the table included below, for systems with a peak demand of 2500MW, 5000MW, 10,000MW, 20,000MW and 30,000MW:

| Peak Load | Projected Load Reduction Using Interruptible Power Supply Modules (in MW) | | | | | |
|---|---|---|---|---|---|---|
| | Market Penetration (%); 50% Interruption Factor | | | | | |
| | 10% | 20% | 30% | 40% | 50% | 60% |
| 2500 MW | 31 | 62 | 93 | 125 | 156 | 187 |
| 5000 MW | 62 | 125 | 187 | 250 | 312 | 375 |
| 10,000 MW | 125 | 250 | 375 | 500 | 625 | 750 |
| 20,000 MW | 250 | 500 | 750 | 1000 | 1250 | 1500 |
| 30,000 MW | 375 | 750 | 1125 | 1500 | 1875 | 2250 |

While the invention has been described in detail and with reference to specific embodiments thereof, it will be apparent to one skilled in the art that various changes and modifications can be made therein without departing from the spirit and scope thereof. Indeed, the scope of the present invention is intended to be limited only by the claims as appended hereto.

What is claimed is:

1. A customer-based interruptible power supply module for removing interruptible loads from service while maintaining firm loads in service, said module comprising:

a power line input, said power line input divided between a firm power load line and an interruptible power load line, said firm power load line exiting said module as a firm power output;

a normally-closed interruptible power switch disposed in series with said interruptible load power line, the output of said interruptible power load line exiting said module as an interruptible power output; and a load interrupting actuation device, coupled to said interruptible power switch and responsive to an "interrupt" control signal, transmitted by an alternative communication network to said customer-based interruptible power supply module, where upon reception of said "interrupt" control signal, said interruptible power switch opens and disconnects the interruptible power load line from the power input line.

2. A customer-based interruptible power supply module as defined in claim 1 wherein the normally-closed interruptible power switch comprises a power contact hold coil and a normally-closed load interrupting actuating device auxiliary contact disposed in series between the red and neutral leads of the power line input;

a first power contact disposed along the red lead; and a second power contact disposed along the black lead, wherein as long as the power contact hold coil is energized, said first and second power contacts remain closed and the interruptible load power input flows through said switch to the interruptible power output, and when an "interrupt" control signal is received the normally-closed load interrupting actuating device opens to de-energize said power contact hold coil and open said first and second power contacts, disconnecting said interruptible power load line from said interruptible power output.

3. A customer-based interruptible power supply module as defined in claim 2 wherein the normally-closed interruptible power supply switch further comprises an interruption blocking timer to control the length of time the interruptible power supply switch is in the open position.

4. A customer-based interruptible power supply module as defined in claim 3 wherein the interruption blocking timer re-activates said interruptible power supply switch after a predetermined time interval.

5. A customer-based interruptible power supply module as defined in claim 4 wherein the predetermined time interval is not to exceed 30 minutes.

6. A customer-based interruptible power supply module as defined in claim 5 wherein the predetermined time interval is not to exceed 15 minutes.

7. A customer-based interruptible power supply module as defined in claim 3 wherein the interruption blocking timer comprises an interruption blocking timer coil disposed in parallel with the power contact hold coil between the red and neutral power leads; and a normally-open interruption blocking contact disposed in parallel with the normally-closed load interrupting actuating device auxiliary contact.

8. A customer-based interruptible power supply module as defined in claim 1 wherein the normally-closed interruptible power supply switch further comprises a cold load timer for providing an additional delay for re-activating the interruptible power supply load line after a power outage.

9. A customer-based interruptible power supply module as defined in claim 8 wherein the cold load timer comprises
    a cold load coil disposed between the red and neutral leads of the input power line and controlled by a time-delay-pick-up element to be re-energized a predetermined period of time after a power outage; and
    a cold load contact disposed in series with the normally-closed load interrupting actuating device auxiliary contact, said cold load contact for remaining open as long as said cold load coil is de-energized, disconnecting the signal path between the interruptible power load line input from the interruptible power output.

10. A customer-based interruptible power supply module as defined in claim 1 wherein the designation between firm load and interruptible load is determined by the customer.

11. A customer-based interruptible power supply module as defined in claim 1 wherein the load interrupting actuating device is responsive to an "interrupt" control signal transmitted by a telecommunications carrier to the customer.

12. An arrangement for allowing a power utility to drop power supply input to customer-defined interruptible loads, the arrangement comprising
    a power utility sensing arrangement for determining the need to clip power supplied to a customer base comprising a plurality of N customers, and transmitting a "clip load" control signal to a communications network also coupled to the customer base;
    a plurality of N interruptible power supply modules, each module disposed at a separate customer location and comprising
        a power line input, said power line input divided between a firm power load line and an interruptible power load line, said first power load line exiting said module as a firm power output;
        a normally-closed interruptible power switch disposed in series with said interruptible power load line, the output of said interruptible power load line exiting said module as an interruptible power output; and
        a load interrupting actuation device, coupled to said interruptible power switch and responsive to an "interrupt" control signal, transmitted by an alternative communication network to said customer-based interruptible power supply module, where upon reception of said "interrupt" control signal, said interruptible power switch opens and disconnects the interruptible power load line from the power input line.

13. An arrangement for allowing a power utility to drop power supply input to customer-defined interruptible loads as defined in claim 12 wherein the normally-closed interruptible power switch comprises
    a power contact hold coil and a normally-closed load interrupting actuating device auxiliary contact disposed in series between the red and neutral leads of the power line input;
    a first power contact disposed along the red lead; and
    a second power contact disposed along the black lead, wherein as long as the power contact hold coil is energized, said first and second power contacts remain closed and the interruptible load power input flows through said switch to the interruptible power output, and when an "interrupt" control signal is received; the normally-closed load interrupting actuating device opens to de-energize said power contact hold coil and open said first and second power contacts, disconnecting said interruptible power load line from said interruptible power output.

14. An arrangement for allowing a power utility to drop power supply input to customer-defined interruptible loads as defined in claim 13 wherein the normally-closed interruptible power supply further comprises
    an interruption blocking timer to control the length of time the interruptible power supply switch is in the open position.

15. An arrangement for allowing a power utility to drop power supply input to customer-defined interruptible loads as defined in claim 14 wherein the interruption blocking timer re-activates said interruptible power supply switch after a predetermined time interval.

16. An arrangement for allowing a power utility to drop power supply input to customer-defined interruptible loads as defined in claim 15 wherein the predetermined time interval is not to exceed 30 minutes.

17. An arrangement for allowing a power utility to drop power supply input to customer-defined interruptible loads as defined in claim 16 wherein the predetermined time interval is not to exceed 15 minutes.

18. An arrangement for allowing to drop a power utility to drop power supply input to customer-defined interruptible loads as defined in claim 14 wherein the interruption blocking timer comprises
    an interruption blocking timer coil disposed in parallel with the power contact hold coil between the red and neutral power leads; and
    a normally-open interruption blocking contact disposed in parallels with the normally-closed load interrupting actuating device auxiliary contact.

19. A customer-based interruptible power supply module as defined in claim 12 wherein the normally-closed interruptible power supply switch further comprises
    a cold load timer for providing an additionally delay for re-activating the interruptible power supply load line after a power outage.

20. A customer-based interruptible power supply module as defined in claim 19 wherein the cold load timer comprises
    a cold load coil disposed between the red and neutral leads of the input power line and controlled by a time-delay-pick-up element to be re-energized a predetermined period of time after a power outage; and
    a cold load contact disposed in series with the normally-closed load interrupting actuating device auxiliary contact, said cold load contact for remaining open as long as said cold load coil is de-energized, disconnecting the signal path between the interruptible power load line from the interruptible power output.

21. A customer-based interruptible power supply module as defined in claim 12 wherein the designation between firm load and interruptible load is determined by the customer.

22. A customer-based interruptible power supply module as defined in claim 12 wherein the load interrupting actuating device is responsive to an "interrupt" control signal transmitted by a telecommunications carrier to the customer.

* * * * *